March 19, 1935.  R. R. SANDERSON  1,994,791

DRILL BIT

Filed July 30, 1932  2 Sheets-Sheet 1

INVENTOR
*Ray R. Sanderson*
BY *Evans & McCoy*
ATTORNEYS

March 19, 1935.  R. R. SANDERSON  1,994,791

DRILL BIT

Filed July 30, 1932  2 Sheets-Sheet 2

INVENTOR
Ray R. Sanderson
BY Evans & McCoy
ATTORNEYS

Patented Mar. 19, 1935

1,994,791

UNITED STATES PATENT OFFICE 1,994,791

DRILL BIT

Ray R. Sanderson, Orrville, Ohio

Application July 30, 1932, Serial No. 626,904

5 Claims. (Cl. 255—63)

This invention relates to means for assembling drill bit tips and drill bit blades for use in churn and percussion drilling.

In my co-pending application, Serial No. 614,866 filed June 2, 1932, I have described a drill bit tip of nickel file steel or other very hard metal which, in assembled form with a drill bit blade, may be used in all types of churn and percussion drilling. The assembly disclosed in this and the aforesaid application is particularly designed to replace the older conventional drill bit, which was of great weight and which was joined directly to a drill stem by means of a taper bolt.

The removable drill bit tips which have been proposed heretofore for use in churn and percussion drilling have very generally proven unsatisfactory in actual use because of the breaking down of the means by which they were secured together. The failure of this union has frequently been caused by the loosening of the parts while the bit was in service. Other failures were due to the delicacy of the parts used to secure the bit tip to the bit blade. No commercially acceptable joint has been known to have been developed for this type of equipment prior to that shown in my aforesaid application.

The present invention relates to the connection or joint by means of which separate drill bit tips may be depended upon to remain assembled with their drill bit blades during use in percussion and churn drilling.

One of the objects of the present invention is to provide a drill bit assembly which permits quick and easy interchange of drill bit tips upon the end of a drill bit blade, so that a plurality of such drill bit tips may be consecutively and interchangeably used in replacing a drill bit tip made dull or worn in the drilling operation, or for drilling different characters of rock or ground formations.

A further object is to provide a drill bit tip and blade assembly which is rigidly secured together in such a manner that the blade and tip cannot be readily separated, nor can either be deformed while in the drill hole irrespective of the angular torque to which the junction of the drill bit tip and drill bit blade is subjected.

Another object is to provide a joint between a drill bit blade and a drill bit tip which positively and strongly interlocks the two members together and is of sufficiently simplified construction so that the disengagement of the two members may be accomplished quickly and easily.

An additional object is to provide a joint between an assembled drill bit blade and drill bit tip which is of great strength and which presents a substantially uniform, closed, and aperture-free surface at the cutting zone.

A further object is to provide a drill bit tip and blade assembly of sufficient hardness and toughness and of such design that there will be substantially no looseness develop at the plane of junction of the blade and tip during the most severe use.

An additional object of the invention is to provide a connection that has impact faces for the drill bit tip and the bit blade that are normal to the longitudinal axis of the bit blade, so that the churning of the bit in service will be transmitted between the parts uniformly and at right angles to the cutting face.

With the above and other objects in view, which will be readily apparent from the following detailed description, the present invention consists in certain construction and combinations of parts which will be readily understood by those skilled in the art to which the invention appertains.

In the accompanying drawings, which illustrate suitable embodiments of the present invention, Figure 1 is a side elevational view of a preferred form of drill bit blade and tip assembly;

Figure 1:
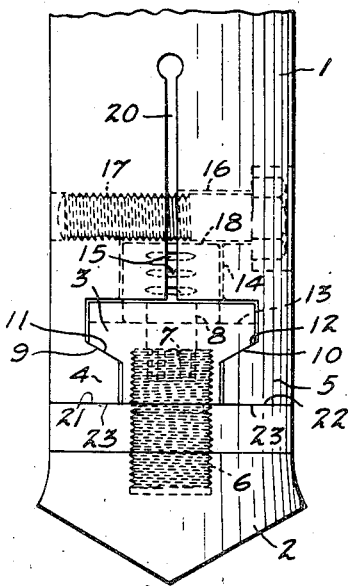
Figure 2:
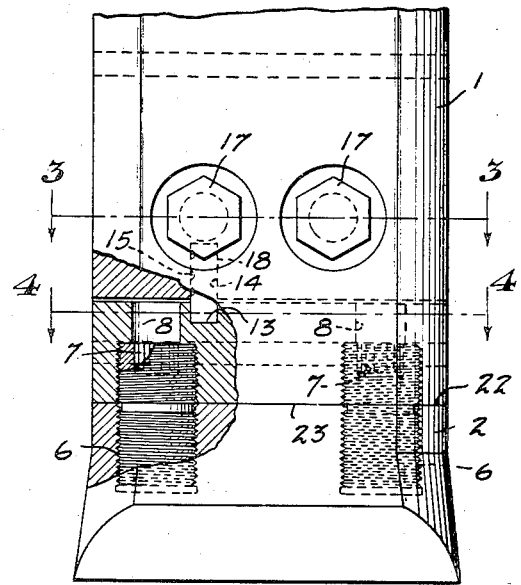
Fig. 2 is a side elevational view, partly in section, of the assembly shown in Fig. 1 and taken at right angles thereto.

A preferred form of drill bit blade and tip assembly is shown in Figures 1 to 4 inclusive.

The bit assembly shown in Figs. 1 to 4 inclusive comprises a drill bit blade 1 to which is secured a drill bit tip 2 of very hard metal.

The drill bit tip 2 is secured to the drill bit blade 1 by the interlocking of a dovetailed tongue 3 of the bit tip between the interfitting portions 4 and 5 of the drill bit blade. The dove-tailed tongue 3 of the bit tip is preferably secured to the bit tip by one or more right-left threaded anchor studs 6. Each of the anchor studs 6 has an internally splined wrench socket 7 or other suitable wrench-engaging means at its upper extremity and made accessible through the wrench aperture 8 formed preferably so that it is accessible from the top of the tongue 3. The oppositely disposed inclined wedge faces 9 and 10 formed on the lateral side of the bit tongue 3 are designed to make wedging engagement with the similarly inclined wedge faces 11 and 12 of the interfitting portions 4 and 5 of the drill bit blade. A suitable keyway 13 is formed in the upper face of the tongue and arranged to index with a key-receiving aperture 14 that is formed in the bit blade. The upper end of the key aperture 14 opens into one of the transverse bolt apertures 16 in order to permit the key to be lifted out of the keyway 13 when the corresponding suitable transverse clamping bolt 17 is removed. A suitable key 18 is mounted within the blade through suitable apertures formed in the projecting shoulder portions 4 and 5 of the blade if a wider key is required. The key is given ample lateral clearance in the blade aperture 14, so that it does not interfere with clamping the tip in place. A plurality of indentations 15 are formed in the sides of the key 18 for the accommodation of a drift pin or other tool (not shown) by means of which the key 18 may be elevated or lowered within the keyway 13 and the key aperture 14. The blade 1 is longitudinally split, as indicated at 20, so that the interfitting portions 4 and 5 of the blade may be drawn together transversely of the drill bit blade. Impact faces 21 and 22 are formed on the lower extremity of the portions 4 and 5 of the drill bit blade and are arranged to engage the impact faces 23 of the bit tip. Both sets of impact faces are preferably normal to the bit blade axis and are accurately ground to provide a suitable impact-transmitting connection between the blade and bit tip.

From the above description, it will be seen that the bit tip may be readily inserted in the blade by removing the clamping bolt 17 that overlies the key aperture 14 and loosening the other clamping bolt 17. The key 18 is then pushed up into the clamping bolt aperture 16 and the tongue portion 3 of the bit tip is forced into place between the wedging portions 4 and 5 of the bit blade. In this position the key 18 may be moved into the keyway of the tongue 3 to prevent movement of the bit tip relative to the blade. The clamping bolts 17 are then drawn up to wedge the impact faces of the blade and tip together, so that there is no looseness between the parts.

In removing the bit tip, the operations are reversed, the key 18 is lifted and the bit tip is pulled in the direction of the tongue to release it from the blade.

Figure 5:
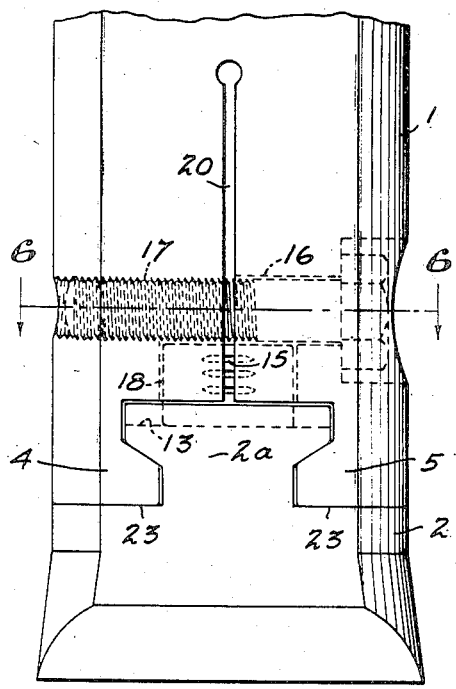
Fig. 5 is a side elevational view of a modified form of drill bit and blade assembly.
Figure 3:
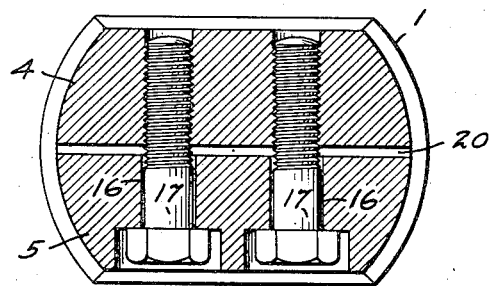
Fig. 3 is a transverse sectional view taken along the line 3—3 of Fig. 2.
Figure 4:
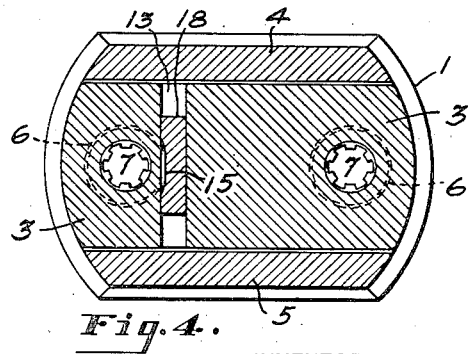
Fig. 4 is a transverse sectional view taken along the line 4—4 of Fig. 2.
Figure 6:
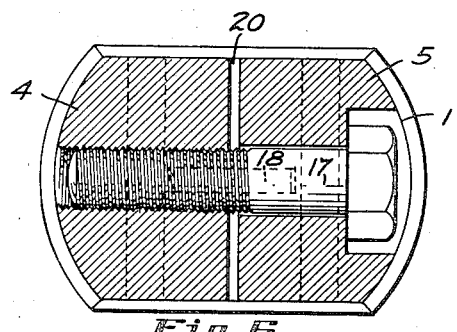
Fig. 6 is a transverse sectional view taken along the line 6—6 of Fig. 5.
Figure 7:
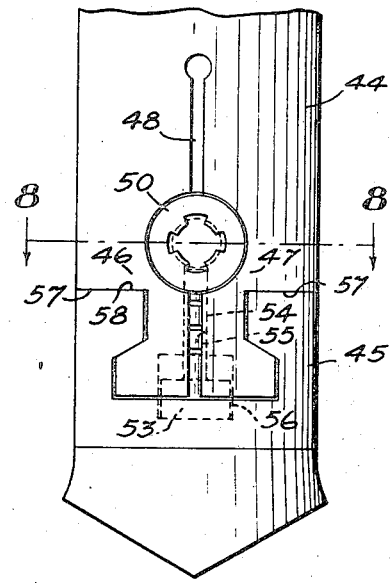
Fig. 7 is a side elevational view of a further modification of the drill bit blade and tip assembly.
Figure 9:
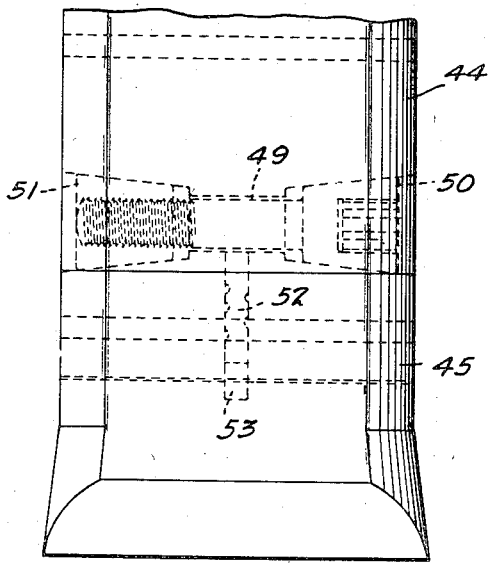
Fig. 9 is a side elevational view of a further modified form of drill bit blade and tip assembly.
Figure 8:
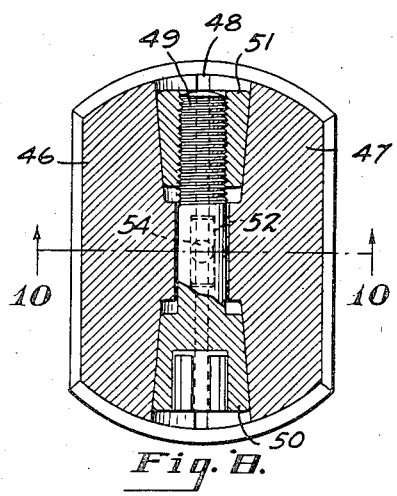
Fig. 8 is a transverse sectional view taken along the line 8—8 of Fig. 7.
Figure 10:
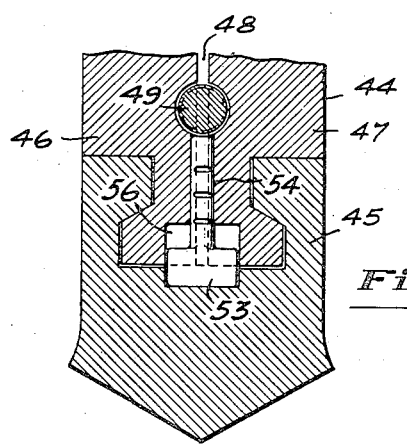
Fig. 10 is a vertical sectional view taken substantially along the line 10—10 of Fig. 8.

By separately forming the body of the bit tip and the tongue portion 3, both parts may be hardened and then ground so that the impact faces of the tip register accurately with the impact faces of the drill blade and also so that the wedging faces of the tongue may be more accurately formed. The tongue and body portion of the bit tip may also be formed in one piece, as shown in Fig. 5 and Fig. 6, although this is somewhat more expensive construction by reason of the inconvenience of accurately grinding the impact faces. In this construction the clamping bolt extends across the bit blade in a direction parallel with the cutting edge, and therefore only one clamping bolt 18 is required. The construction is otherwise the same as that previously described. One of the advantages of this construction is that the impact faces of the blade overlie the more active cutting ends of the bit tip. The assembly and disassembly of this construction is substantially the same as that previously described.

Another modified form of drill bit and blade assembly embodying the invention is shown in Figs. 7, 8, 9 and 10. In this construction the drill bit blade 44 secures the drill bit tip 45 at its lower extremity by the expansion of the longitudinally split bit-carrying portions 46 and 47 of the lower extremity of the drill bit blade. The tongue portions 46 and 47 are separated by a longitudinal slot 48 and are spread apart from each other by an expander bolt 49 that has a conical head 50 on one end that is provided with a wrench-engaging means and a conical expander nut 51 on the other end.

A key 52, that has an elongated head 53 and a stem 54, is carried in a suitable key aperture 55 formed in the blade. The stem portion 54 of the key is of sufficient length to prevent dislodgment of the key from the keyway 56 formed in the bit tip when the expander bolt 49 is in place and the key aperture 55 of the blade is sufficiently deep to permit the key to be lifted out of engagement with the keyway in the bit tip when the expander bolt 49 is removed. The key stem 54 has suitable indentations formed therein for lifting the key out of engagement with the tip.

The bit blade has a pair of impact shoulders 57 that engage corresponding impact faces 58 that are formed on the bit tip for transmitting the jolt from the bit blade to the bit tip in operation.

In disassembling this structure, the expander bolt is first removed. The key is lifted by engaging the indentations formed in the stem 54, and the bit tip is withdrawn. The structure is assembled by reversing this operation.

It will be seen that the bit tip assemblies herein described each transmit the thrust from the bit blade to the bit tip through mating impact faces that are arranged normally to the axis of the tool. Since the working thrusts in the bit blade are generally axial of the blade, the longitudinal split in the blade is not detrimental. The constructions also provide very strong connections between the bit blade and bit tip for resisting thrusts on the bit tip that tend to spin the bit blade.

It is to be understood that the particular embodiments of the present invention shown and described for purposes of illustration and explanation, and that various modifications, of the expander means, positioning of the key, particular designing of the tongue portion and of the split portion of the drill blade, may be made without departing from the invention as defined in the appended claims.

What I claim is:

1. A drill bit assembly, comprising a longitudinally split drill bit blade having a pair of opposed leg portions, impact faces formed on said leg portions and disposed in a plane substantially normal to the axis of said drill bit blade, said leg portions also having a pair of oppositely tapered and oppositely disposed wedging faces, a bit tip having impact faces designed to register with the impact faces of said drill bit blade and having a tongue portion provided with overhanging shoulders designed to engage the wedging faces of said leg portions, bolt means countersunk below the surface of said drill bit blade for drawing said leg portions toward each other to wedge said impact faces together, and separate means interfitting with said bit blade and bit tip and disposed inwardly of the surfaces thereof for preventing longitudinal movement of said bit tongue relative to said bit blade.

2. A drill bit assembly, comprising a drill bit blade having separated leg portions capable of lateral movement relative to each other, each of said leg portions having an impact face formed thereon and a laterally extending shoulder portion having a wedging face formed thereon, a bit tip having a pair of impact faces formed thereon for engagement with the impact faces of said leg portions, said bit tip also having a pair of laterally extending shoulder portions, each having a wedging face formed thereon for engagement with the corresponding wedging face of said leg portions, bolt means countersunk below the surface of said drill bit blade carried by the bit blade for binding said wedging faces of said bit tip and said leg portions together to wedge said impact faces together, and means disposed inwardly of said drill bit assembly and interfitting with said bit blade and bit tip for preventing relative movement therebetween longitudinally of said wedging faces.

3. A drill bit blade and bit tip assembly for use in churn and percussion drilling, comprising a bit tip having an internally threaded stud socket formed therein, an impact face formed on said bit tip, a right-left threaded anchor stud having one end designed to be positioned within said socket, a tongue member having an internally threaded stud socket formed therein for the accommodation of the other end of said anchor stud and indexing with the socket carried by said bit tip, overhanging shoulders formed on said tongue, bit tip tongue-engaging means carried by said bit blade, and means countersunk below the surface of and associated with said bit blade for binding said tongue-engaging means against said tongue member.

4. A drill bit assembly for churn and percussion drilling, comprising a bit tip, a tongue member, means for rigidly securing said tongue member to said bit tip, a bit blade, means carried by said bit blade and countersunk below the surface thereof for causing said bit blade to rigidly grip said tongue member, and separate means accessible from outside of said drill bit assembly and positioned inwardly of both said bit tip and said bit blade for substantially preventing motion of said tongue member transversely of said bit blade.

5. A drill bit assembly for use in churn and percussion drilling comprising in combination, a drill bit blade terminating downwardly in a pair of spaced impact faces disposed substantially normal to the longitudinal axis of said bit blade, a pair of opposed resiliently related shoulder portions formed integrally with said bit blade and having upwardly and outwardly inclined wedge faces forming a part of their transversely inner surfaces, means disposed inwardly of the surface of said bit blade for causing the wedge faces of said shoulder portions to approach each other transversely of said bit blade, with a separate dove-tailed tongue member provided with oppositely disposed outwardly extending shoulder portions having inwardly inclined wedging surfaces adapted for engagement with the wedge faces forming a part of the shoulder portions of said bit blade, a bit tip comprising a pair of spaced impact faces engaging the impact faces of said bit blade, and separate means disposed inwardly of said dove-tailed tongue member and said bit tip for removably securing said dove-tailed tongue member to said bit tip in rigid relation therewith.

RAY R. SANDERSON.